United States Patent
Keung (10) Patent No.: US 6,467,050 B1
(45) Date of Patent: Oct. 15, 2002

(54) METHOD AND APPARATUS FOR MANAGING SERVICES WITHIN A CLUSTER COMPUTER SYSTEM

(75) Inventor: Nam Sang Keung, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/152,541

(22) Filed: Sep. 14, 1998

(51) Int. Cl.[7] .......................... H02H 3/05; C06F 12/00
(52) U.S. Cl. .......................... 714/27; 714/15; 714/23; 714/47; 714/48; 707/206
(58) Field of Search .......................... 714/24, 15, 47, 714/48, 49, 23; 707/206, 104

(56) References Cited

U.S. PATENT DOCUMENTS

| | | | | |
|---|---|---|---|---|
| 5,301,311 A | | 4/1994 | Fushimi et al. ............. 395/575 |
| 5,386,544 A | * | 1/1995 | Nakamura ................... 395/575 |
| 5,446,901 A | * | 8/1995 | Qwicki et al. ............... 395/700 |
| 5,566,297 A | | 10/1996 | Konda et al. ................ 395/182 |
| 5,623,666 A | | 4/1997 | Pike et al. .................... 395/616 |
| 5,666,486 A | | 9/1997 | Alfieri et al. ................ 395/200 |
| 5,819,019 A | * | 10/1998 | Nelson ................... 395/182.02 |
| 5,923,833 A | * | 7/1999 | Freund et al. ......... 395/182.17 |
| 6,088,727 A | * | 7/2000 | Hosokawa et al. ......... 709/223 |

* cited by examiner

Primary Examiner—Norman M. Wright
(74) Attorney, Agent, or Firm—Duke W. Yee; Jeffrey S. LaBaw; Stephen J. Walder, Jr.

(57) ABSTRACT

A method for controlling a set of services in a cluster computer system. The set of services is registered with a service controller in the cluster computer system. The set of services is monitored for a failure of a service within the set of services. In response to a failure of the service, a failure sequence is initiated. An appropriate start sequence is initiated when the failed service can be restarted.

20 Claims, 9 Drawing Sheets

```
cs_components {
    id                  ='CSQL'
    lock_name           ='cscc_lock_shared_mutex_csql'
    executable_name     ='csqld'
    startup_timeout     =7000
    shutdown_timeout    =7000;

id                  ='CSTS'
    lock_name           ='cscc_lock_shared_csts'
    executable_name     ='cstsd'
    startup_timeout     =30000
    shutdown_timeout    =7000;

id                  ='CSGS'
    lock_name           ='cscc_lock_shared_csgs'
    executable_name     ='csgsd'
    startup_timeout     =120000
    shutdown_timeout    =7000;

id                  ='CSQLCE'
    lock_name           ='cscc_lock_shared_csqlce'
    executable_name     ='csqlced'
    startup_timeout     =7000
    shutdown_timeout    =7000;

id                  ='CSTR'
    lock_name           ='cscc_lock_shared_cstr'
    executable_name     ='cstrd'
    startup_timeout     =7000
    shutdown_timeout    =7000;
```

FIG. 13A

```
cscc_environment {
    1320 ─ executable_name ─ 1318         = 'csccd'
           startup_sequence               = 'CSTR,CSQL,CSTS,CSGS,CSQLCE'
    1322 ─ shutdown_sequence              = 'CSQLCE,CSQL,CSGS,CSTS,CSTR'
    1324 ─ startup_timeout                = 250000
           shutdown_timeout ─ 1326        = 40000

1328 ─ restart_retry_counter          = 5
    1330 ─ restart_time_span              = 60000
} csccd_environment {
    1332 ─ lock_shared_daemon_name        = 'cscc_lock_shared_daemon'
    1334 ─ lock_shared_daemon_comp_name   = 'cscc_lock_shared_daemon_comp'
    1336 ─ sem_shared_daemon_comp_name    = 'cscc_sem_shared_daemon_comp';
}
```

FIG. 13B

```
csccmgr_environment {
    1340 ─ lock_shared_name ─ 1338         = 'cscc_lock_shared'
           lock_shared_mgr_name            = 'cscc_lock_shared_mgr'
    1342 ─ sem_shared_daemon_mgr_name      = 'cscc_sem_shared_daemon_mgr'
    1344 ─ mem_shared_name                 = 'cscc_mem_shared';
}
```

FIG. 13C

METHOD AND APPARATUS FOR MANAGING SERVICES WITHIN A CLUSTER COMPUTER SYSTEM

BACKGROUND OF THE INVENTION

1. Technical Field

The present invention relates generally to an improved data processing system, and in particular to an improved method and apparatus for managing services. Still more particularly, the present invention relates to a method and apparatus for managing services in a cluster computer system.

2. Description of Related Art

Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols. TCP/IP stands for Transmission Control Protocol/Internet Protocol. This protocol was developed by the Department of Defense for communications between computers. It is built into the UNIX system and has become the de facto standard for data transmission over networks, including the Internet.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources, including web sites, identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser, such as, for example, Netscape Communicator, which is available from Netscape Communications Corporation.

A web site is typically located on a server, which in some cases may support multiple web sites. In providing information to various users across the Internet, cluster computer systems are often used to provide adequate bandwidth for transmitting and receiving information. Sometimes the services on a cluster computer system may fail and require one or more servers within the cluster computer system to be restarted. It would be advantageous to have a method and apparatus for managing, starting, stopping, and restarting of services within a cluster computer system.

SUMMARY OF THE INVENTION

The present invention provides a method for controlling a set of services in a cluster computer system. The set of services is registered with a service controller in the cluster computer system. The set of services is monitored for a failure of a service within the set of services. In response to a failure of the service, a failure sequence is initiated. An appropriate start sequence is initiated when the failed service can be restarted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
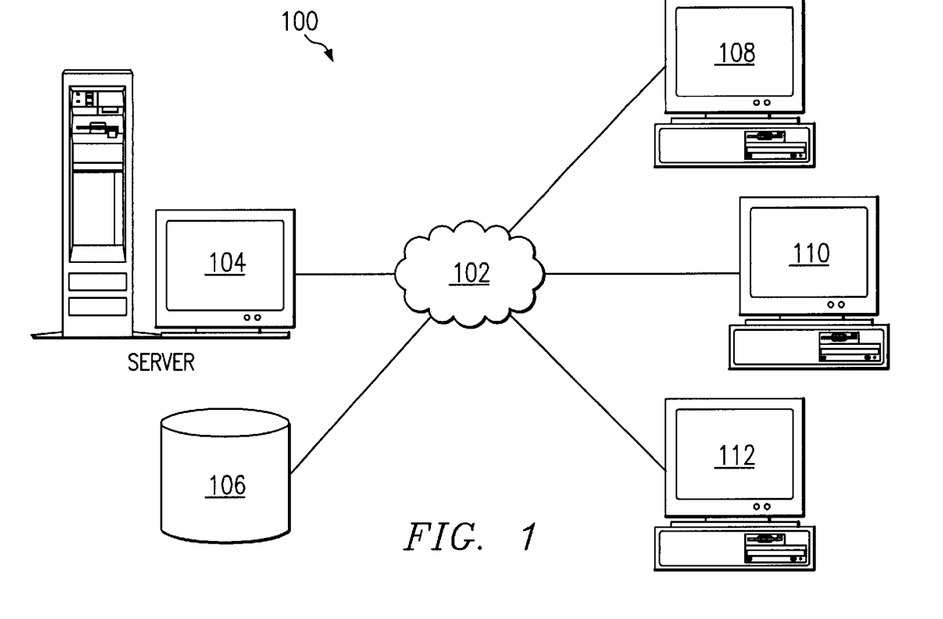
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server system 104 is connected to network 102 along with storage unit 106. Server system 104 may include one or more servers connected to each other in the depicted example. When more than one server is located in server system 104, the system is referred to as a cluster computer system. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server system 104 provides data, such as boot files, operating system images, and applications to clients 108–112. Clients 108, 110, and 112 are clients to server system 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as for example, an intranet or a local area network.

FIG. 1 is intended as an example, and not as an architectural limitation for the processes of the present invention.

Figure 2:
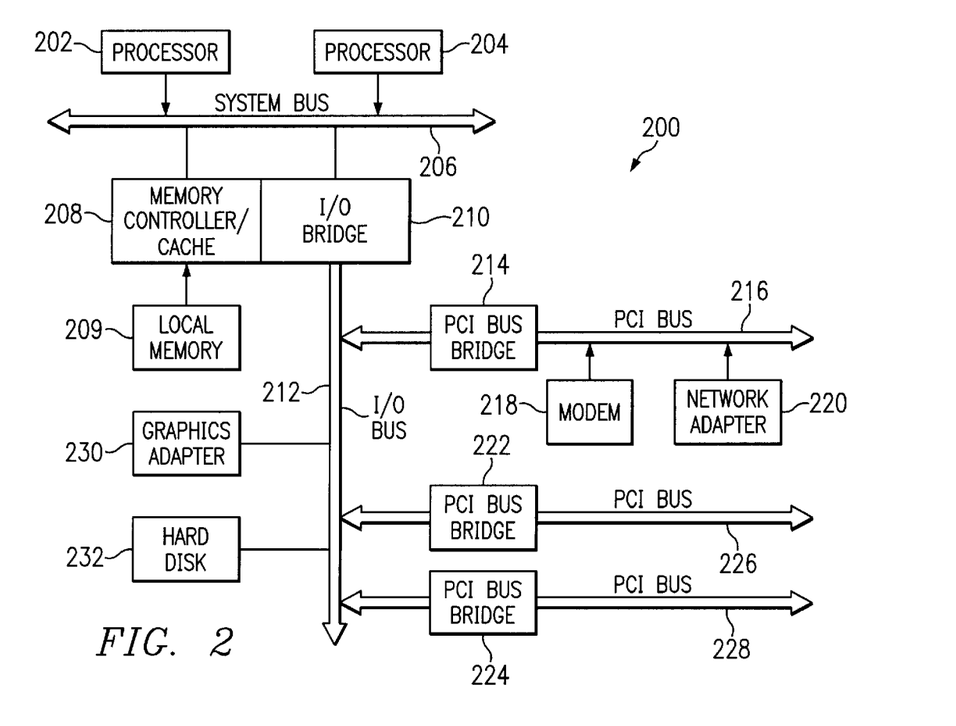
FIG. 2 is a block diagram of a data processing system, which may be implemented as a server, in accordance to the present invention.

Referring to FIG. 2, a block diagram of a data processing system, which may be implemented as a server, is depicted in accordance to the present invention. In the instance that server system 104 is implemented as a single server, data processing system 200 may be used as the server. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
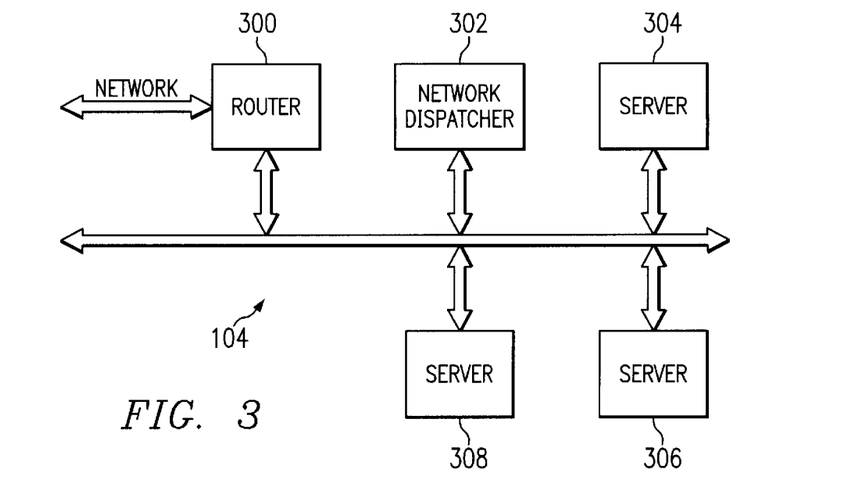
FIG. 3 is a diagram of a server system in the form of a cluster computer system in accordance with a preferred embodiment of the present invention.

With reference now to FIG. 3, a diagram of a server system in the form of a cluster computer system is depicted in accordance with a preferred embodiment of the present invention. In accordance with a preferred embodiment of the present invention, the processes of the present invention may be implemented to manage processes in a cluster computer system, as illustrated in FIG. 3. Server system 104 from FIG. 1 in the depicted example is a cluster computer system configured with a router 300, a load balancing data processing system 302 and servers 304–308. Corresponding reference numbers in different figures represent corresponding components unless specified otherwise. Router 300 receives packets destined for server system 104 from network 102. Load balancing data processing system 302 routes packets received by router 300 to an appropriate server from servers 304–308. In the depicted example, load balancing data processing system 302 employs load balancing processes to maximize efficiency in processing requests from various clients. One or more of the servers in servers 304–308 may implement the processes of the present invention. These servers may be implemented using a server such as data processing system 200 in FIG. 2. The server system illustrated in FIG. 3 is not intended to imply architectural limitations to a server system implementation of the present invention.

The present invention provides a method, apparatus, and instructions for managing services within a cluster computer system. In particular, the present invention provides a cluster coordinator manager that may spawn a cluster coordinator daemon to startup, stop, and restart a set of services provided by the cluster computer system. The cluster coordinator manager may start up through a cluster coordinator daemon a set of services that have been registered with the cluster coordinator manager. The information on the registered services may be found in a data structure such as a computer configuration file (i.e., cscomputer.cfg). This configuration file contains information, such as startup sequence, shutdown sequence, time out information, and path names for the registered services.

In the depicted examples, a cluster coordinator provides a facility for starting, stopping, and restarting all services provided by a cluster computer system. A cluster coordinator resides on each computer within a cluster computer system. The cluster coordinator first started. The cluster coordinator will bring up other services in the appropriate order and will monitor each of the services and provide the necessary restart in the event of failure of one or more services within the cluster computer system. Failure of a service on another computer may be detected through a cluster service that monitors services on other computers within the cluster computer system.

Figure 4:
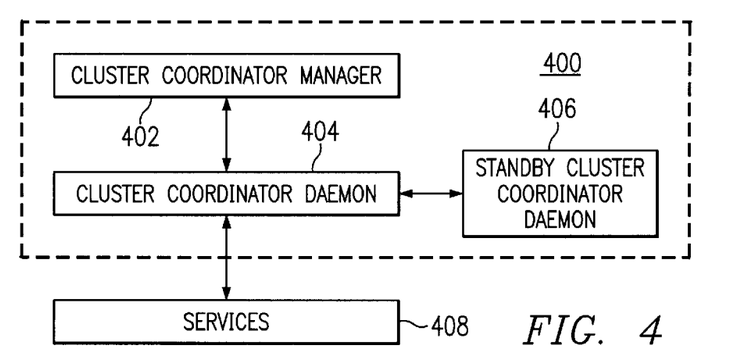
FIG. 4 is a diagram of components used in managing services in accordance with a preferred embodiment of the present invention.

With reference now to FIG. 4, a diagram of components used in managing services is depicted in accordance with a preferred embodiment of the present invention. In managing services, the present invention cluster coordinator components 400, cluster coordinator manager 402, cluster coordinator daemon 404, and standby cluster coordinator daemon 406 are all used to manage services 408. Cluster coordinator manager 402, cluster coordinator daemon 404, and standby cluster coordinator daemon 406 provide the ability to start, stop, and restart services 408 operating on servers on a cluster computer system. Services 408 are services that have been registered for use with cluster coordinator components 400. Services 408 are monitored for failures, and when a service fails, the components are employed to restart services 408 in the proper order. Cluster coordinator manager 402 is an executable program responsible for starting, stopping, or restarting services 408. The program includes a start command used to start services in the proper order based on a start up sequence listed in a configuration file. In addition, a stop command is provided to shutdown services 408 in an order specified by a shutdown sequence in the configuration file. A restart command is used to restart all of the services using the stop and start commands.

Cluster coordinator daemon 404 is spawned off as a daemon process when a start command is used to cluster coordinator manager 402. Cluster coordinator daemon 404 spawns off or starts all of the services based on the order listed the startup sequence in the configuration file. In starting these services, cluster coordinator daemon 404 also passes a first argument to each of the cluster services during the start up process. In the depicted example, this first argument is "-cc", which is used to active features or code that is used by services 408 for interaction with cluster coordinator components 400. In addition, cluster coordinator daemon 404 monitors services 408. Services 408 are services that are registered with cluster coordinator components 400. In addition, cluster coordinator daemon 404 is responsible for stopping and restarting services 408 in the proper order when any service failure occurs. Standby cluster coordinator daemon 406 is present and monitors cluster coordinator daemon 404 for a failure or absence of this component. If cluster coordinator daemon 404 fails, the services will be shutdown. Then the services will be restarted with standby cluster coordinator daemon 406 becoming the cluster coordinator daemon.

Services 408 include a number of different services executing on a server in a cluster computer system. These services include services that provide databases that contain configuration and status information for the cluster computer system. In addition, services 408 also include services used in managing a cluster computer system. These services include monitoring activity of services on other computers within the cluster computer system and allowing the addition and removal of computers from the cluster computer system. Services 408 also may include applications providing services to users, such as, for example, an E-Mail program or a spreadsheet program.

Figure 5:
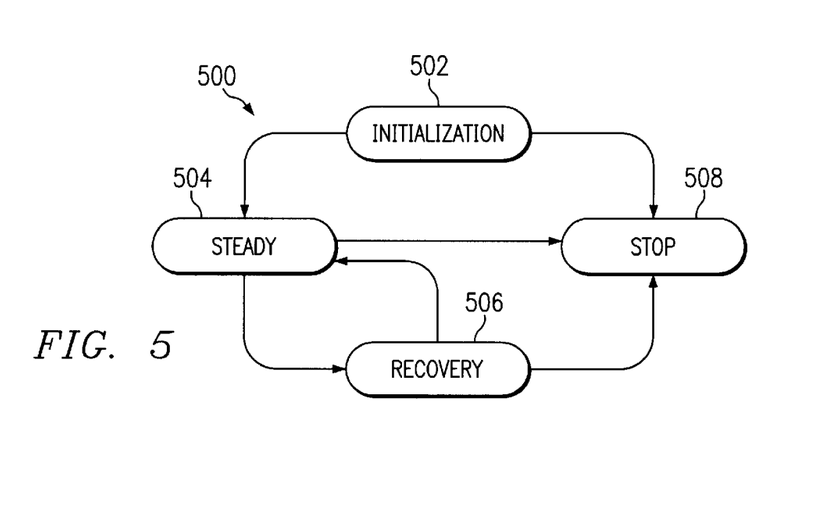
FIG. 5 is a diagram illustrating the states for cluster coordinator components in accordance with a preferred embodiment of the present invention.

With reference now to FIG. 5, a diagram illustrating the states for cluster coordinator components is depicted in accordance with a preferred embodiment of the present invention. State machine 500 represents states for the cluster coordinator components. State machine 500 begins in an initialization state 502 in which all cluster service configuration information, is obtained from the configuration file. In addition, in the initialization state, the services are started in the order specified in the start up sequence. After the services have been successfully started, state machine 500 shifts to steady state 504 in which monitoring for a failure of services or of the cluster coordinator daemon occurs. If a failure occurs, the state machine 500 shifts into recovery state 506 in which services are restarted. If the cluster coordinator daemon fails first, the services will be shutdown in recovery state 506, and the standby cluster coordinator daemon will become the cluster coordinator daemon and restart the services after the services have been shutdown. State machine 500 may shift into stop state 508 in response to a stop command being used with the cluster coordinator manager or in response to a failure to restart services properly in recovery state 506. As can be seen, this state may be entered by any other state in state machine 500. Stop state 508 results in the services being shutdown and the other cluster coordinator components being terminated.

The processes are managed by the cluster coordinator components using shared mutexes to detect the process status between state transitions. A mutex is a mechanism for providing exclusive access control for resources between processes. Through the use of mutexes, processes may access and lock a shared resource, such as a shared memory. A manager mutex is created when a start command is issued. This mutex is locked during the startup process and is unlocked after the startup process is completed. This mutex is not generated in response to a stop command. A daemon mutex is created and locked while the cluster coordinator daemon is spawned off. This daemon mutex is unlocked if the cluster coordinator daemon is terminated. The present invention also employs a daemon component mutex, which is created and locked while the cluster coordinator daemon is spawned. The daemon component mutex is shared with all cluster services. This mutex is unlocked during the shutdown state or recovery state. The daemon component mutex is used to allow the cluster services to shutdown if the cluster coordinator daemon process is terminated. A component mutex is created and locked for each cluster service that is spawned by the cluster coordinator daemon. This mutex is used to detect the status of the service and is unlocked if the cluster service is terminated. A shared memory mutex is used by the services to access a shared memory structure. A daemon standby mutex is shared by the cluster coordinator daemon and the standby cluster coordinator daemon. This mutex is used by the standby cluster coordinator daemon to detect the presence of the cluster coordinator daemon.

Figure 6:
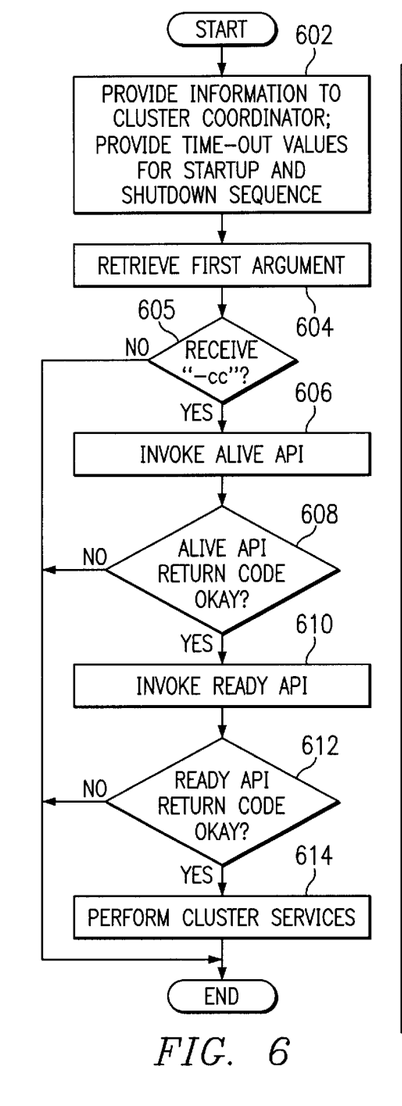
FIG. 6 is a flowchart of a process for registering services in accordance with a preferred embodiment of the present invention.

With reference now to FIG. 6, a flowchart of a process for registering services is depicted in accordance with a preferred embodiment of the present invention. The process begins by providing information for use by the cluster configuration manager (step 602). This information may include, for example, an executable program name for use by the cluster coordinator daemon to start up the process or time out values for the start up and shutdown sequence. All services started by the cluster coordinator daemon have a specific amount of time to perform all required initialization and registration with the cluster coordinator daemon. If the service does not respond within the specified amount of time, this service is terminated by the cluster coordinator daemon. This step helps avoid situations in which a component hangs and the cluster coordinator daemon has to wait for an infinite amount of time.

Thereafter, the first argument is retrieved (step 604). A determination is made as to whether the first argument is a "-cc" (step 605). In the depicted example, the first argument is a "-cc" from the main argument, which is provided as an indication that the service is to interface with the cluster coordinator components. If the first argument is a "-cc", the alive API is invoked (step 606). This API is used to indicate to the cluster coordinate components that the service is up and running. This API provides a shutdown routine for callback to shutdown the service when the cluster coordinator daemon decides to shutdown services. Thereafter, a determination is made as to whether a return code indicates that this API is correctly executing (step 608). If the API return code indicates that the API is okay, the process then invokes the ready API (step 610). This API is invoked after initialization of the service is complete and it is time to begin interacting with other services on the server computer. A determination is then made as to whether the return code indicates that the ready API is executing (step 612). If the return code indicates that the ready API is executing, the service then executes normally to provide services (step 614) with the registration process terminating thereafter. With reference again to steps 608 and 612, if either of the return codes do not indicate that APIs are executing normally, the services terminate. Steps 600 and 602 only need to be performed the first time that the service is registered with the cluster coordinator components. These steps are not actually performed by the services but are steps used to include information within the configuration file.

When a failure other than services executing on various computers within the cluster computer system occurs, each service is responsible for taking appropriate actions whenever these events occur. For example, a failure of a service on another computer within the cluster computer system will cause a restart of all services on all of the computers within the cluster computer system.

Figure 7A:
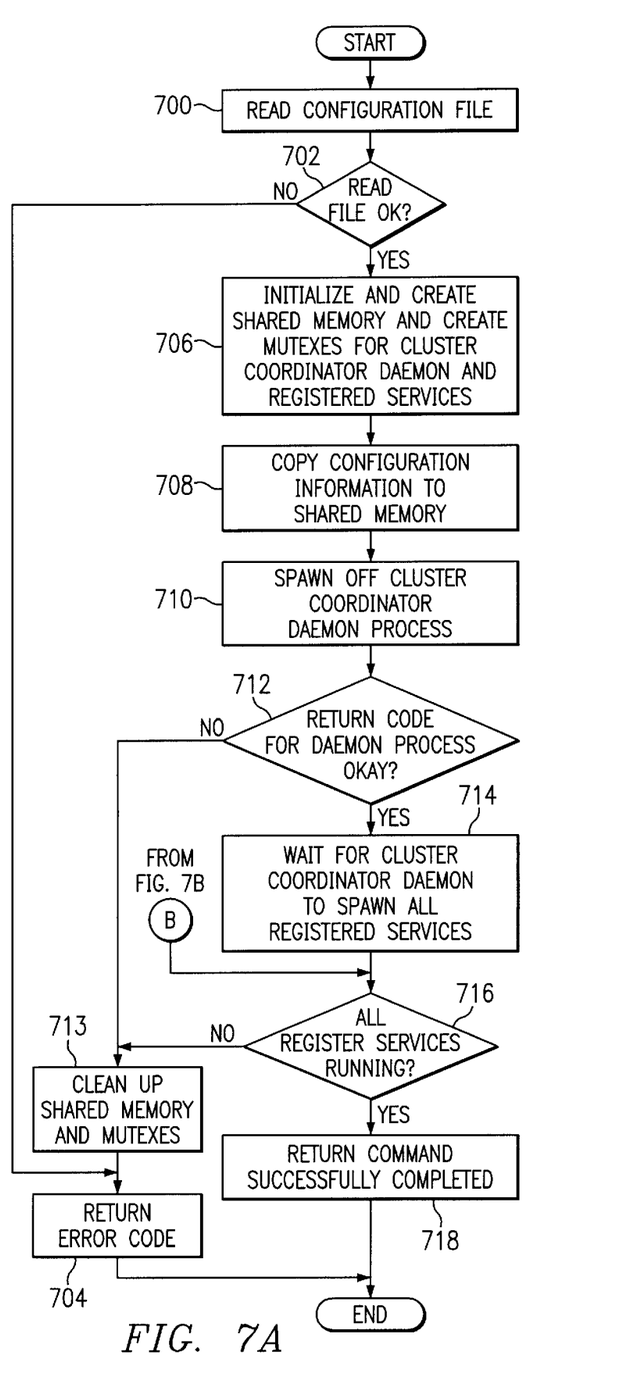
FIGS. 7A–7B are a flowchart of a process for initializing services in accordance with a preferred embodiment of the present invention.

Turning now to FIG. 7A, a flowchart of a process for initializing services in response to a start command is illustrated in accordance with a preferred embodiment of the present invention. This process is used during the initialization state. The process begins by reading a configuration file (step 700) to obtain start up and shutdown information. A determination is made as to whether the configuration file is okay (step 702). If the configuration file is not okay, an error code is returned to indicate a configuration error (step 704) with the process terminating thereafter. If the configuration file is usable, the shared memory is initialized and created and mutexes are created for the cluster coordinator daemon, the standby cluster coordinator, and registered services (step 706). A mutex indicates to potential users of the shared resource whether the resource is in use and prevents access by more than one user.

Next, configuration information is copied to the shared memory (step 708). The cluster coordinator daemon is spawned (step 710). A determination is then made as to whether the cluster coordinator daemon was successfully spawned (step 712). If the cluster coordinator daemon is not running, the process proceeds to cleanup the memory and mutexes (step 713) and then proceeds to step 704 to return an error code. Otherwise, the process waits for the cluster coordinator daemon to spawn all of the registered services (step 714). Thereafter, a determination is made as to whether all registered services have been successfully started and are running (step 716). If the services are not running, the process proceeds to step 713 as described above. Otherwise, an indication is returned that the start command has been successfully completed (step 718) with the start process terminating thereafter.

Figure 7B:
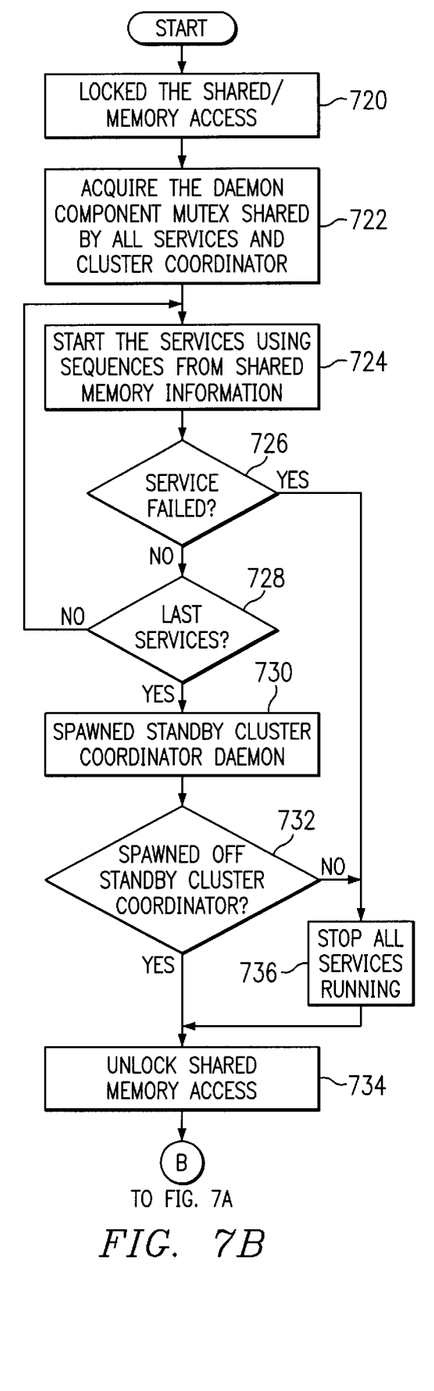

With reference now to FIG. 7B, a flowchart of a process for starting services by the cluster coordinator daemon is depicted in accordance with a preferred embodiment of the present invention. The process begins by locking the shared memory (step 720). This step is used to prevent access to the shared memory to processes other than the cluster coordinator daemon. Next, acquire the daemon component mutex (step 722). The mutex is used in the recovery state to shutdown and restart of services. A service is then started using the startup sequence in the shared memory (step 724). A determination is then made as to whether any service started has failed (step 726). If no services have failed, a determination is made as to whether the service started in step 726 is the last service in the startup sequence (step 728). If more service in the sequence has not been started, the process then returns to step 724. Otherwise, the standby cluster coordinator daemon is spawned (step 730). Then, a determination is made as to whether the standby cluster coordinator daemon was successfully started (step 732). If the answer to this determination is yes, the process then unlocks the shared memory (step 734) with the process proceeding to step 716 in FIG. 7A.

With reference again to step 726, if a service has failed during the startup of services, all of the services that have been started are shutdown using the shutdown sequence if possible (step 736) with the process then proceeding to step 716 in FIG. 7A.

Figure 8:
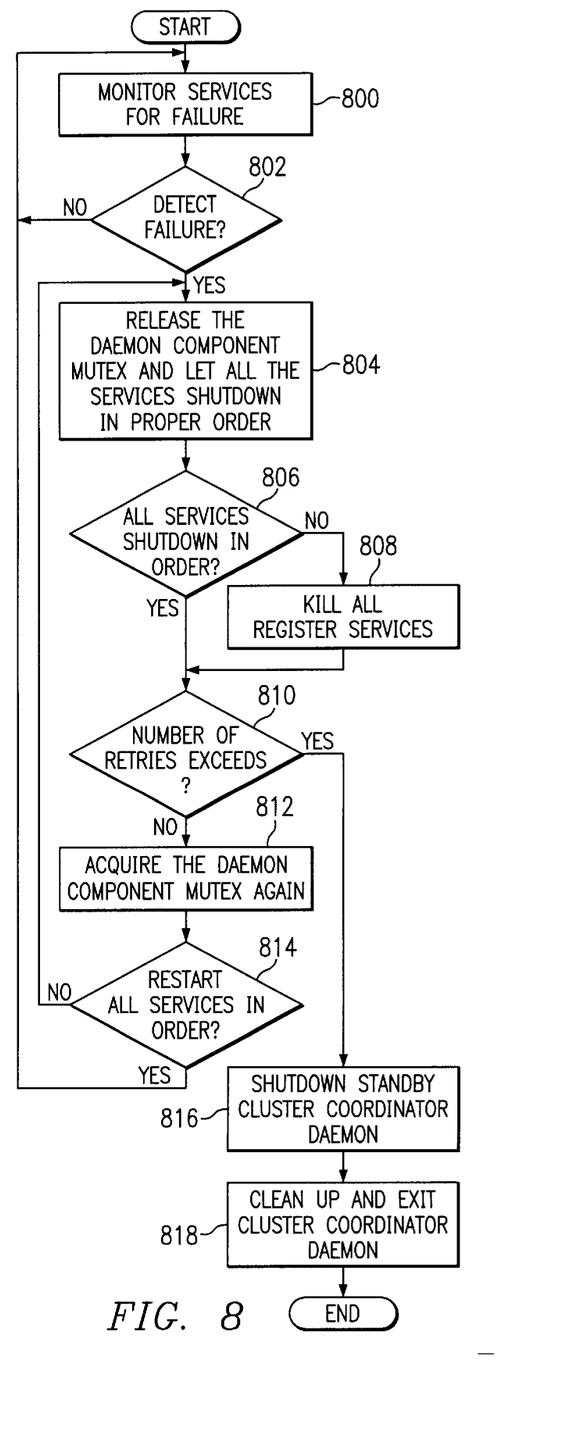
FIG. 8 is a flowchart of a process for monitoring and handling service failures in accordance with a preferred embodiment of the present invention.

Turning now to FIG. 8, a flowchart of a process used in the steady state and recovery state by a cluster coordinator daemon is illustrated in accordance with a preferred embodiment of the present invention. This process is employed by a cluster coordinator daemon to monitor the services and provide shutdown and restarting of services in the event a service fails. The process begins by monitoring services by a failure (step 800). A determination is made as to whether a failure has been detected (step 802). If a failure of a service is absent, the process will return to step 800. Otherwise, the daemon component mutex is released, which allows the services to start accessing the shared memory and shutdown in the proper order based on the shutdown sequence information from the configuration file stored in the shared memory (step 804). Thereafter, a determination is made as to whether the services were shutdown in the proper order (step 806). If the services were not shutdown in the proper order, all of registered services are killed or terminated (step 808). Then, a determination is made as to whether the number of retries has been exceeded (step 810). The number of retries is selected to terminate attempts to restart the services when a successful restart is unlikely. The process proceeds directly to step 810 from step 806 when the services have been shutdown in the proper order. If the number of retries has not been exceeded, the daemon component mutex for the cluster coordinator daemon is acquired by the cluster coordinator daemon (step 812). Thereafter, a determination is made as to whether the services have been restarted in the proper order (step 814). If the services have been restarted in the proper order based on the startup sequence from the configuration file, the process then returns to step 800 as described above. Otherwise, the process returns to step 804 to release the daemon component mutex.

With reference again to step 810, if the number of retries has been exceeded, the standby cluster coordinator daemon is shutdown (step 816). Then, cleanup occurs and the cluster coordinator daemon is terminated (step 818) with the process terminating thereafter.

Figure 9:
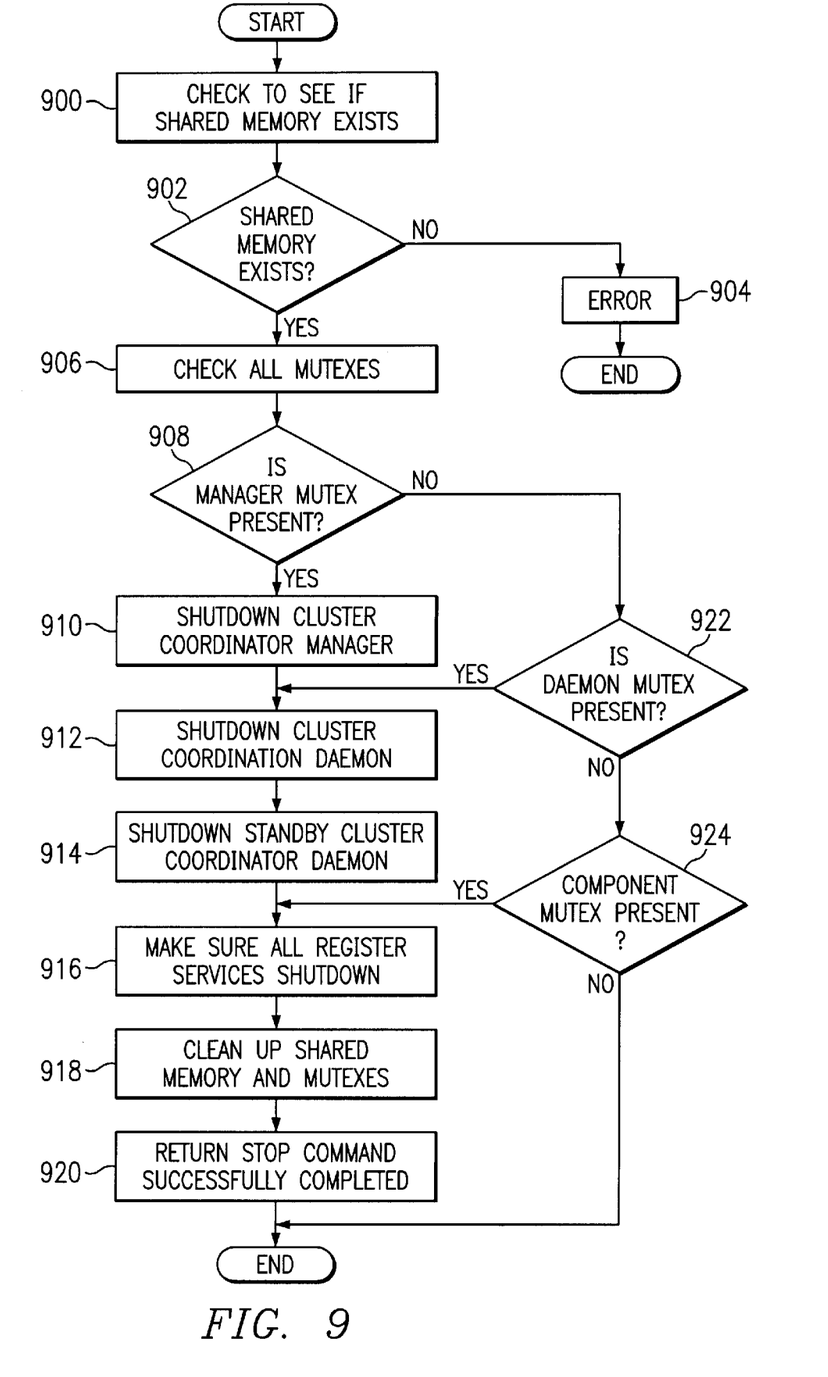
FIG. 9 is a flowchart of a process for stopping services in response to a stop command sent to a cluster coordinator manager in accordance with a preferred embodiment of the present invention.

With reference now to FIG. 9, a flowchart of a process for stopping services in response to a stop command sent to a cluster coordinator manager is depicted in accordance with a preferred embodiment of the present invention. The process begins by checking the shared memory (step 900). A determination is made as to whether the shared memory exists (step 902). If the shared memory does not exist, an error is returned (step 904) with the process terminating thereafter. Otherwise, all the mutexes are checked (step 906). Then, a determination is made as to whether all the manager mutex is present (step 908). If the manager mutex is present, the cluster coordinator manager is shutdown (step 910), and then the cluster coordinator daemon is shutdown (step 912). Next, the standby cluster coordinator daemon is shutdown (step 914). Then, the process makes sure that all of the registered services are shutdown (step 916), and the shared memory and mutexes are cleaned up (step 918). Afterwards, an indication of the successful completion of the stop command is returned (step 920). This command may be used if the cluster coordinator daemon is removed and the services cannot be removed while the cluster coordinator daemon is absent. This command is used to notify the services to clean up and exit.

With reference again to step 908, if all the mutexes are not present, a determination is made as to whether the daemon mutex is present (step 922). If the daemon mutex is present, then process the proceeds to step 912 as described above. Otherwise, a determination is made as to whether the component mutex is present (step 924). If the component mutex is present, the process then proceeds to step 916 as described above. Otherwise, the process terminates.

Figure 10:
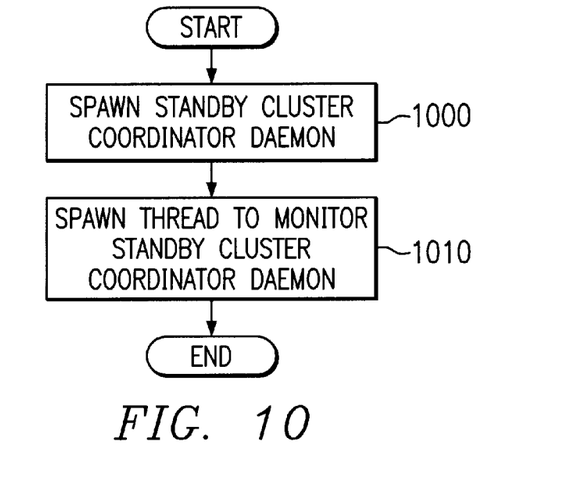
FIG. 10 is a flowchart of a process for creating a standby cluster coordinator daemon in accordance with a preferred embodiment of the present invention.

Turning now to FIG. 10, a flowchart of a process for creating a standby cluster coordinator daemon is depicted in accordance with a preferred embodiment of the present invention. The process begins by spawning the standby cluster coordinator daemon (step 1000). When the standby cluster coordinator daemon is spawned, a thread is created to monitor the cluster coordinator daemon (step 1002). The monitoring is performed through the use of a daemon standby mutex. If the cluster coordinator daemon fails, the standby cluster coordinator daemon becomes the cluster coordinator daemon.

Figure 11:
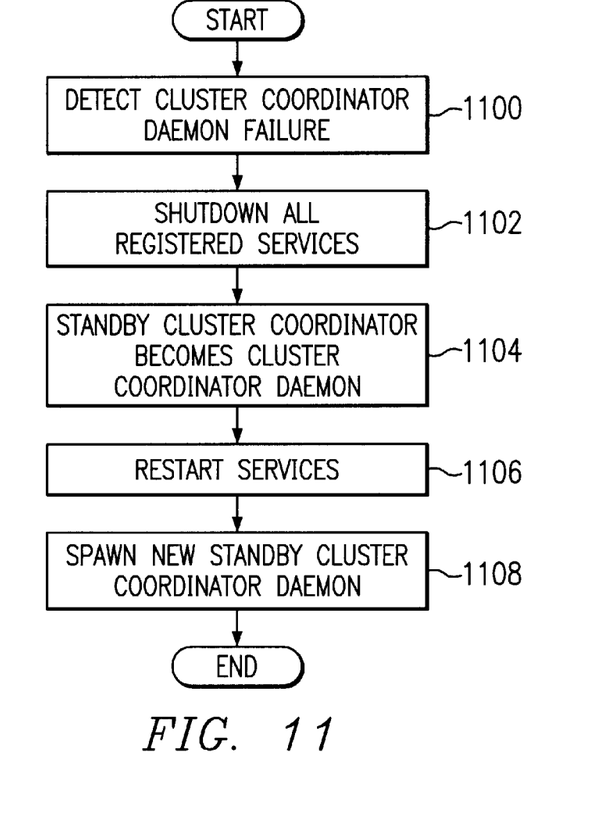
FIG. 11 is a flowchart of a process for restarting services in accordance with a preferred embodiment of the present invention.

With reference now to FIG. 11, a flowchart of a process for a standby cluster coordinator daemon for shutting down and restarting services is depicted in accordance with a preferred embodiment of the present invention. This process is used in the recovery state when a cluster coordinator daemon has failed. The process begins by detecting a cluster coordinator daemon failure (step 1100). The failure is detected when the standby cluster coordinator daemon is able to acquire the daemon standby mutex, which is normally held by the cluster coordinator daemon. In response, the registered services are shutdown (step 1102). The shutdown in step 1102 uses the processes described in FIG. 8. The standby cluster coordinator daemon wakes from the suspended state by detecting the failure of the cluster coordinator daemon using the daemon standby mutex. When the last service shuts down, the standby cluster coordinator daemon becomes the primary cluster coordinator daemon. The standby cluster coordinator daemon becomes the cluster coordinator daemon (step 1104), and restarts the services (step 1106). The restarting of services uses the process described in FIG. 8. In addition, a new standby cluster coordinator daemon is spawned (step 1108).

If the standby cluster coordinator daemon goes away during the suspended state, the suspended state wakes the primary cluster coordinator daemon. The primary cluster coordinator daemon responds by spawning another standby cluster coordinator daemon.

Figure 12:
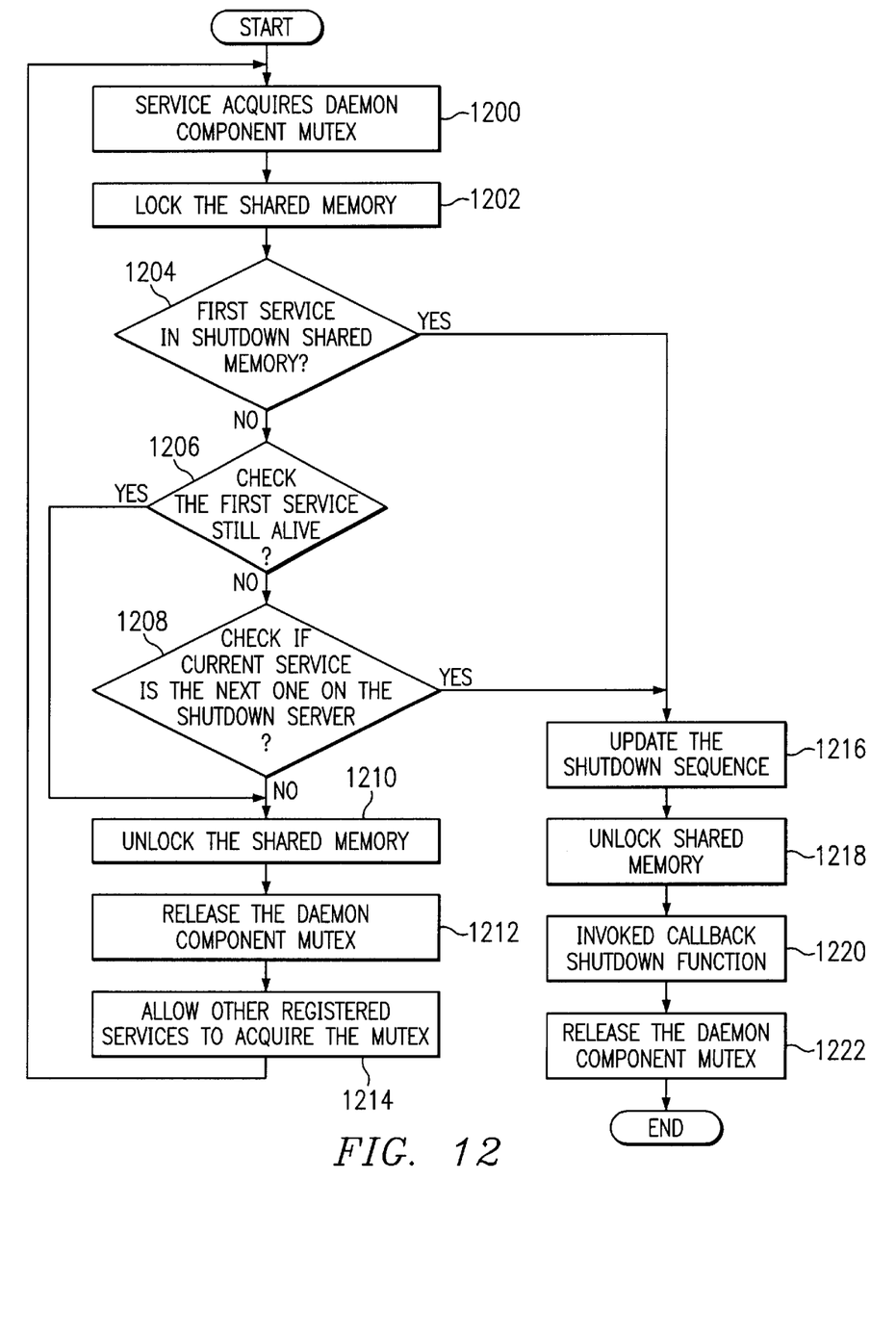
FIG. 12 is a flowchart illustrating the mechanism used by a service to shutdown in accordance with a preferred embodiment of the present invention.

Turning now to FIG. 12, a flowchart illustrating the mechanism used by a service to shutdown is depicted in accordance with a preferred embodiment of the present invention. The process begins by a service acquiring the daemon component mutex (step 1200). Each service that is initialized includes a suspended thread to acquire the mutex for the shutdown information. If one service acquires the daemon component mutex, other services are blocked from acquiring this mutex. The service then locks the shared memory such that no other services can access the shared memory (step 1202). A determination is made as to whether the service accessing the shared memory is the first service in the shutdown sequence in the shared memory (step 1204). If the service is not the first service, the process then determines whether the first service listed in the shared memory is still alive or executing (step 1206). If the first service is not still alive, a determination is then made as to whether the current service is the next service on the shutdown sequence (step 1208). If the current service is not the next service on the shutdown sequence, the shared memory is unlocked (step 1210), and the daemon component mutex is released (step 1212). Thereafter, other services are allowed to acquire the mutex (step 1214) with the process then returning to step 1200 as described above.

Referring again to step 1206, if the service is the first service in shutdown sequence, the shutdown sequence is updated (step 1216). The shared memory is then unlocked (step 1218), and the callback shutdown function is invoked (step 1220). Then the daemon component mutex is released (step 1222) with the process terminating thereafter. This shared memory mechanism allows for an orderly shutdown of the services. This shutdown may occur even when the cluster coordinator daemon fails. The daemon component mutex is held by the cluster coordinator daemon until the cluster coordinator daemon releases this mutex or fails.

With reference again to step 1206, if the first service is still present, the process then proceeds directly to step 1210. With reference again to step 1208, if the current service is the next one on the shutdown sequence, the process then proceeds to step 1216 as described above.

Figure 13A:
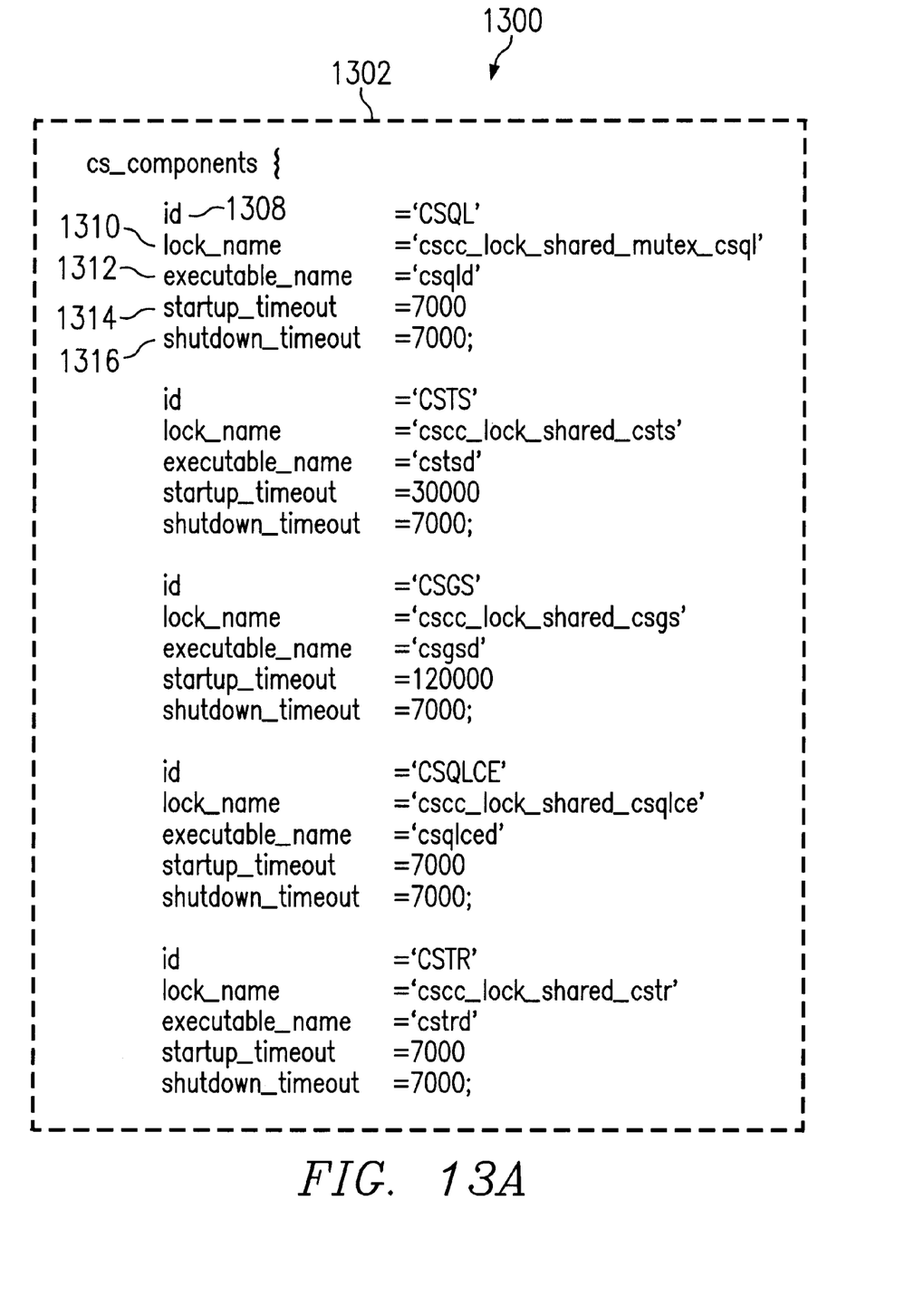
FIGS. 13A–13C are illustrations of entries in a configuration file in accordance with a preferred embodiment of the present invention.
Figure 13B:
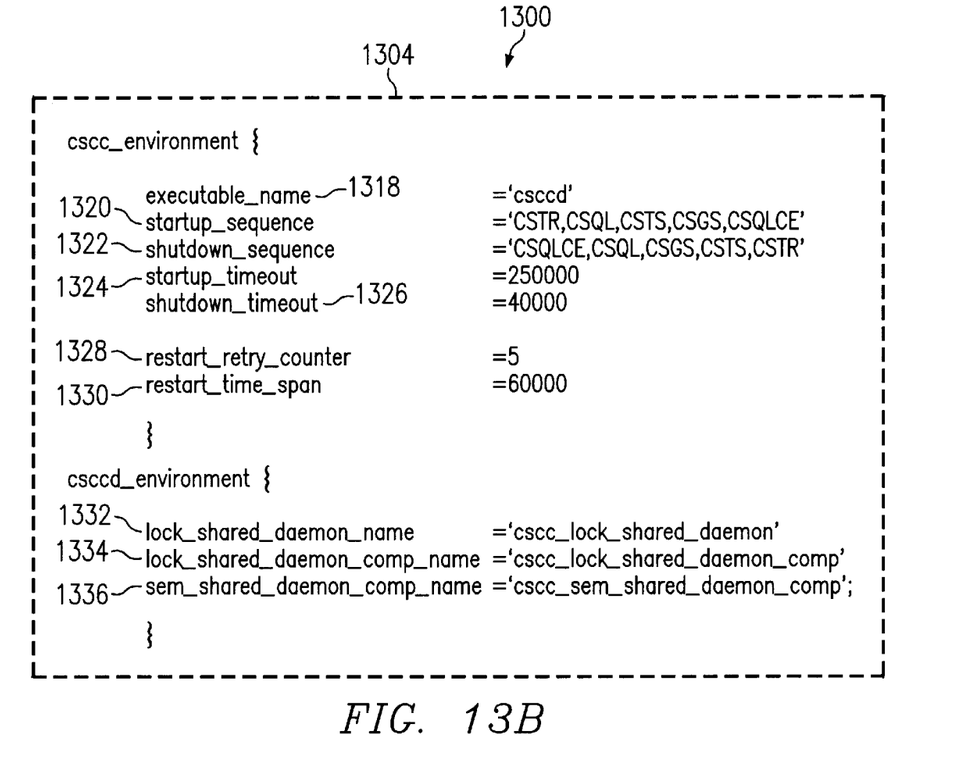

With reference now to FIGS. 13A–13B, are illustrations of entries in a configuration file are depicted in accordance with a preferred embodiment of the present invention. Configuration file 1300 includes a cluster services configuration table 1302, a daemon configuration table 1304, and a manager configuration table 1306. Cluster services configuration table 1302 includes entries for the various services that are registered. The entries include an identification 1308 for the service, a lock name 1310, executable name 1312, start up time out 1314, and a shutdown time out 1316.

Lock name 1310 is the name of the component mutex used to detect component process status. Executable name 1312 is the name of the program used to start the service. Start up time out 1314 is the maximum time that will be used to start up the service, and shutdown time out 1316 is the maximum time that will be allowed to shutdown the service. Both time out values are in milliseconds in the depicted example.

Cluster services configuration table 1302 includes information used by the cluster coordinator daemon. These entries includes: executable name 1318, lock name 1319, startup sequence 1320, shutdown sequence 1322, startup time out 1324, shutdown time out 1326, restart retry counter 1328, and restart time span 1330.

Executable name 1318 is the program used to start the cluster coordinator. Startup sequence 1320 is the start up sequence for starting the services while shutdown sequence 1322 is the sequence used to shutdown services. As can be seen, these two sequences may vary. Startup time out 1324 is the maximum amount of time allowed to startup all of the services and shutdown time out 1326 is the maximum amount of time allowed to shutdown all of the services. Restart retry counter 1328 is used to determine the maximum number of retries that will be made in starting up the services. Restart time span 1330 indicates the amount of time that passes before the number of retries are automatically reset.

Cluster services configuration table 1302 also includes the name of the daemon mutex 1332, name of the daemon component mutex 1334, and the name of the semaphore 1336 used by the cluster coordinator daemon. Semaphore 1336 is the communication channel used between the cluster coordinator daemon and the services.

Figure 13C:
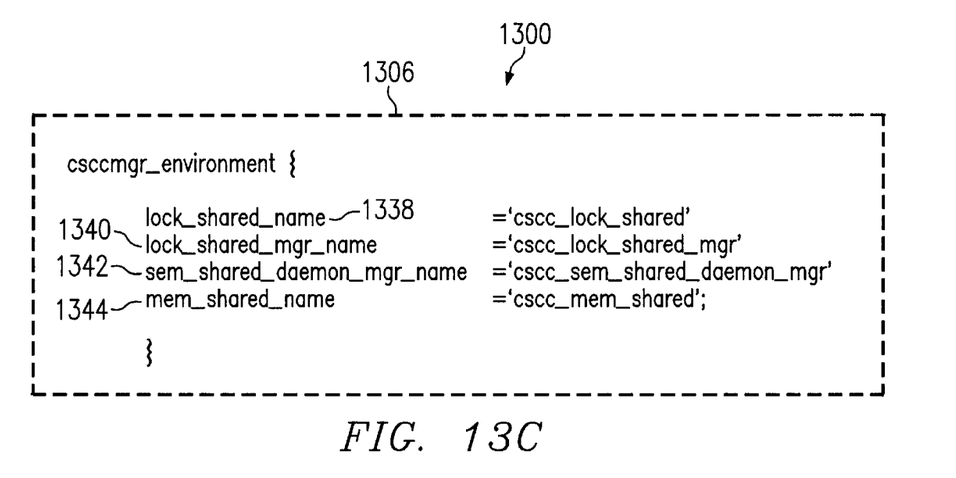

Manager configuration table 1306 includes lock shared name 1338, manager name 1340, semaphore 1342, and memory shared name 1344.

Lock shared name 1338 is the shared memory name. Manager name 1340 is the name of the manager mutex. Semaphore 1342 is the communications channel between the cluster coordinator manager and the cluster coordinator daemon processes. Memory shared name 1344 is the shared memory mutex used by all components and services to access the shared memory.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for controlling a set of services in a cluster computer system, the method comprising the computer implemented steps of:

registering the set of services with a service controller in the cluster computer system;

monitoring the set of services for a failure of a service within the set of services;

responsive to the failure of the service, initiating a shutdown sequence; and initiating an appropriate start up sequence, wherein the shutdown sequence and start up sequence are ordered lists of a plurality of services of the set of services, and wherein the shutdown sequence and start up sequence are stored in a data structure.

2. The method of claim 1, wherein the sets of services are monitored by a cluster coordinator daemon.

3. The method of claim 1, wherein the cluster computer system includes a shared memory, wherein the shutdown sequence is stored within the shared memory and wherein the step of initiating a shutdown sequence includes allowing the set of services to access the shared memory to determine which services within the set of services should be shutdown using the shutdown sequence.

4. The method of claim 3, wherein the appropriate start up sequence is stored in the shared memory and wherein a cluster coordinator daemon initiates starting the set of services using the start up sequence.

5. The method of claim 1, wherein a daemon component mutex is used to shutdown services identified in the shutdown sequence and start up services identified in the start up sequence.

6. A method for managing a set of services in a cluster computer system, the method comprising the computer implemented steps of:

monitoring the set of services for a failure of a service within the set of services;

responsive to detecting a failure of a service within the set of services, initiating a shutdown of the set of services in an order required to properly shutdown the set of services; and restarting the set of services in an order required for proper operation of the set of services, wherein the set of services are shutdown in accordance with a shutdown sequence and the set of services are restarted in accordance with a start up sequence, the shutdown sequence and start up sequence being ordered lists of the set of services, and wherein the shutdown sequence and start up sequence are stored in a data structure.

7. The method of claim 6 further comprising starting the set of services in a selected order.

8. The method of claim 7, wherein the set of services are started in the selected order by a cluster coordinator daemon.

9. A cluster computer system having a set of services, the cluster computer system comprising:

registration means for registering the set of services with a service controller in the cluster computer system;

monitoring means for monitoring the set of services for a failure of a service within the set of services;

first initiating means, responsive to the failure of the service, for initiating a shutdown sequence; and second initiating means for initiating an appropriate start up sequence, wherein the shutdown sequence and start up sequence are ordered lists of a plurality of services of the set of services, and wherein the shutdown sequence and start up sequence are stored in a data structure.

10. The cluster computer system of claim 9, wherein the sets of services are monitored by a cluster coordinator daemon.

11. The cluster computer system of claim 10, wherein the cluster computer system includes a shared memory, wherein the shutdown sequence is stored within the shared memory and wherein the step of initiating a shutdown sequence includes allowing the set of services to access the shared memory to determine which services within the set of services should be shutdown using the shutdown sequence.

12. The cluster compute system of claim 11, wherein the appropriate start up sequence is stored in the shared memory and wherein a cluster coordinator daemon initiates starting the set of services using the start up sequence.

13. A cluster computer system having a set of services, the cluster computer system comprising:

monitoring means for monitoring the set of services for a failure of a service within the set of services;

first initiating means, responsive to detecting a failure of a service within the set of services, for initiating a shutdown of the set of services in an order required to properly shutdown the set of services; and restarting means for restarting the set of services in an order required for proper operation of the set of services, wherein the set of services are shutdown in accordance with a shutdown sequence and the set of services are restarted in accordance with a start up sequence, the shutdown sequence and start up sequence being ordered lists of the set of services, and wherein the shutdown sequence and start up sequence are stored in a data structure.

14. The cluster computer system of claim 13 further comprising second starting means for starting the set of services in a selected order.

15. The cluster computer system of claim 14, wherein the set of services are started in the selected order by a cluster coordinator daemon.

16. A computer program product in a computer readable medium for managing a set of services in a cluster computer system, the computer program product comprising:

first instructions for registering the set of services with a service controller in the cluster computer system;

second instructions for monitoring the set of services for a failure of a service within the set of services;

third instructions, responsive to the failure of the service, for initiating a shutdown sequence; and fourth instructions for initiating an appropriate start up sequence, wherein the shutdown sequence and start up sequence are ordered lists of a plurality of services of the set of services, and wherein the shutdown sequence and start up sequence are stored in a data structure.

17. A method of managing a set of services in a cluster computer system, comprising:

registering the set of services with a cluster coordinator;

writing, to a shared memory, a configuration file having a start up sequence identifying an ordered list of services of the set of services;

spawning the cluster coordinator daemon process to monitor the set of services for a failure of a service within the set of services;

starting services in the set of services using the cluster coordinator daemon process based on the start up sequence; and monitoring the set of services using the cluster coordinator daemon process.

18. The method of claim 17, further comprising spawning a standby cluster coordinator daemon process.

19. The method of claim 17, wherein monitoring the set of services further includes:

determining if a service fails;

providing the services in the set of services access to the shared memory; and shutting down the services in the set of services based on a shutdown sequence stored in the shared memory.

20. The method of claim 19, wherein shutting down the services in the set of services includes:

determining if a mutex for the cluster coordinator is present in the shared memory;

shutting down the cluster coordinator daemon process, then the standby cluster coordinator, and then the services if the mutex is present in the shared memory.

* * * * *

UNITED STATES PATENT AND TRADEMARK OFFICE
CERTIFICATE OF CORRECTION

PATENT NO.   : 6,466,931 B1
DATED        : October 15, 2002
INVENTOR(S)  : Gopi K. Attaluri and David J. Wisneski It is certified that error appears in the above-identified patent and that said Letters Patent is hereby corrected as shown below:

<u>Title page,</u>
Item [57], ABSTRACT,
Line 10, after "query" add -- execution plan for the new query --

<u>Column 2,</u>
Line 29, remove "to" and replace with -- two --.

<u>Column 6,</u>
Line 51, remove "suing" and replace with -- string --.

<u>Column 7,</u>
Line 16, remove "The" and replace with -- the --.

Signed and Sealed this

Fifteenth Day of April, 2003

JAMES E. ROGAN
*Director of the United States Patent and Trademark Office*